United States Patent

Ingram et al.

Patent Number: 5,829,091
Date of Patent: Nov. 3, 1998

[54] AUTOMOBILE CENTRAL VACUUM CLEANING SYSTEM

[76] Inventors: Curt R. Ingram; Donna E. Ingram, both of 3 Rivers Resort 7764 Lapush Rd., Forks, Wash. 98331

[21] Appl. No.: 711,546

[22] Filed: Sep. 10, 1996

[51] Int. Cl.$^6$ .................................................. A47L 5/38
[52] U.S. Cl. ............................................. 15/313; 15/422
[58] Field of Search ............................. 15/313, 339, 422

[56] References Cited

U.S. PATENT DOCUMENTS

| | | | |
|---|---|---|---|
| 1,810,607 | 6/1931 | Irons | 15/313 |
| 3,384,916 | 5/1968 | Hockin | 15/313 |
| 3,431,581 | 3/1969 | Booth | 15/313 |
| 3,449,787 | 6/1969 | Rothstein et al. | 15/313 |
| 3,663,432 | 5/1972 | Ellison | 15/313 X |
| 3,998,385 | 12/1976 | Ogle | 15/313 X |
| 5,189,753 | 3/1993 | Sousa et al. | 15/313 |

*Primary Examiner*—Chris K. Moore

[57] ABSTRACT

A new Automobile Central Vacuum Cleaning System for providing the opportunity to vacuum an automobile anytime or anywhere. The inventive device includes a vacuum generating unit, a remote vacuum port, and a vacuum cleaner hose. A remote vacuum line is located within the panels of an automobile and provides connection between a vacuum intake port of the vacuum generating unit and a vacuum hose attachment end of the remote vacuum port. The remote vacuum port is located strategically and conveniently within the passenger compartment of the automobile. The vacuum generating unit includes a vacuum motor and a debris collection unit. Power to the vacuum generating unit may be generated by the battery or engine of the automobile and may be controlled by a remote power switch which is installed in a convenient location such as a dash board, a control/instrumentation panel, or console of the automobile. The debris collection unit is located in a convenient place such that a debris receptacle located within the debris collection unit is readily accessible and may be emptied when necessary. A convenient location of the debris collection unit is under the hood of the automobile. The vacuum cleaner hose may be of the extendable/retractable type and may be stored under a front seat or in a rear compartment of the automobile. A vacuum cleaner hose attachment tool may be attached to the vacuum cleaner hose. Attachment tools of those commonly used with vacuum cleaners may be used. The remote vacuum port includes a vacuum port anti-clogging screen to prevent the intake of large objects into the remote vacuum line and a vacuum port sealing cover to cover the end of the remote vacuum port when not in use.

11 Claims, 3 Drawing Sheets

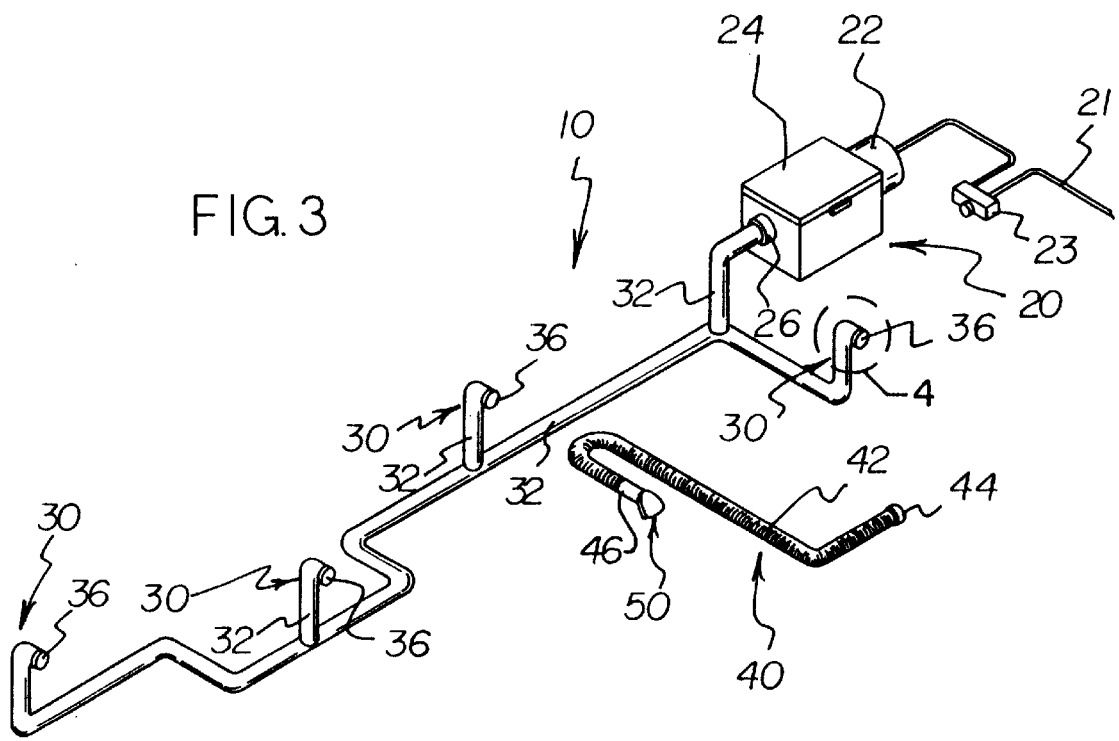
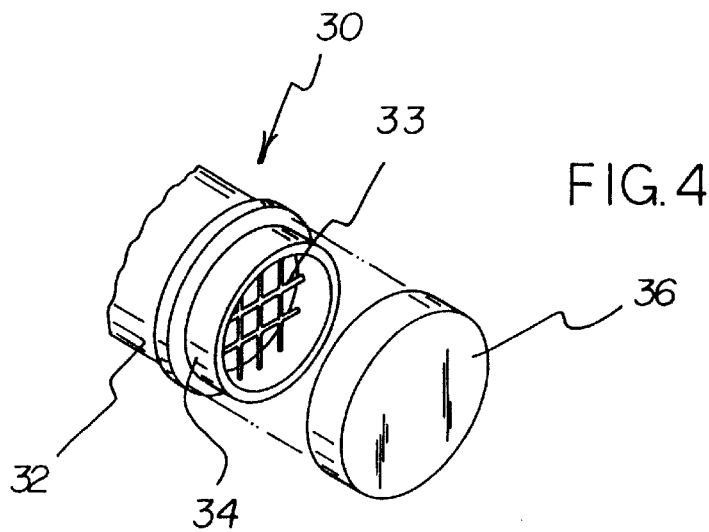

AUTOMOBILE CENTRAL VACUUM CLEANING SYSTEM

BACKGROUND OF THE INVENTION

1. Field of the Invention

The present invention relates to vacuum cleaning systems and more particularly pertains to a new Automobile Central Vacuum Cleaning System for providing the opportunity to vacuum an automobile anytime or anywhere.

2. Description of the Prior Art

The use of vacuum cleaning systems is known in the prior art. More specifically, vacuum cleaning systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art vacuum cleaning systems include U.S. Pat. No. 5,189,753; U.S. Pat. No. 4,829,626; U.S. Pat. No. 5,274,878; U.S. Pat. No. 5,239,727; U.S. Pat. No. 4,991,253; and U.S. Pat. No. D294,187.

While these devices fulfill their respective, particular objectives and requirements, the aforementioned patents do not disclose a new Automobile Central Vacuum Cleaning System. The inventive device includes a vacuum generating unit, a remote vacuum port, and a vacuum cleaner hose.

In these respects, the Automobile Central Vacuum Cleaning System according to the present invention substantially departs from the conventional concepts and designs of the prior art, and in so doing provides an apparatus primarily developed for the purpose of providing the opportunity to vacuum an automobile anytime or anywhere.

SUMMARY OF THE INVENTION

In view of the foregoing disadvantages inherent in the known types of vacuum cleaning systems now present in the prior art, the present invention provides a new Automobile Central Vacuum Cleaning System construction wherein the same can be utilized for providing the opportunity to vacuum an automobile anytime or anywhere.

The general purpose of the present invention, which will be described subsequently in greater detail, is to provide a new Automobile Central Vacuum Cleaning System apparatus and method which has many of the advantages of the vacuum cleaning systems mentioned heretofore and many novel features that result in a new Automobile Central Vacuum Cleaning System which is not anticipated, rendered obvious, suggested, or even implied by any of the prior art vacuum cleaning systems, either alone or in any combination thereof.

To attain this, the present invention generally comprises a vacuum generating unit, a remote vacuum port, and a vacuum cleaner hose.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Automobile Central Vacuum Cleaning System apparatus and method which has many of the advantages of the vacuum cleaning systems mentioned heretofore and many novel features that result in a new Automobile Central Vacuum Cleaning System which is not anticipated, rendered obvious, suggested, or even implied by any of the prior art vacuum cleaning systems, either alone or in any combination thereof.

It is another object of the present invention to provide a new Automobile Central Vacuum Cleaning System which may be easily and efficiently manufactured and marketed.

It is a further object of the present invention to provide a new Automobile Central Vacuum Cleaning System which is of a durable and reliable construction.

An even further object of the present invention is to provide a new Automobile Central Vacuum Cleaning System which is susceptible of a low cost of manufacture with regard to both materials and labor, and which accordingly is then susceptible of low prices of sale to the consuming public, thereby making such Automobile Central Vacuum Cleaning System economically available to the buying public.

Still yet another object of the present invention is to provide a new Automobile Central Vacuum Cleaning System which provides in the apparatuses and methods of the prior art some of the advantages thereof, while simultaneously overcoming some of the disadvantages normally associated therewith.

Still another object of the present invention is to provide a new Automobile Central Vacuum Cleaning System for providing the opportunity to vacuum an automobile anytime or anywhere.

Yet another object of the present invention is to provide a new Automobile Central Vacuum Cleaning System which includes a vacuum generating unit, a remote vacuum port, and a vacuum cleaner hose.

Still yet another object of the present invention is to provide a new Automobile Central Vacuum Cleaning System that contains built-in vacuum ports located conveniently throughout an automobile.

Even still another object of the present invention is to provide a new Automobile Central Vacuum Cleaning System that allows for immediate and convenient vacuuming of an automobile without having to use a commercial coin-operated vacuum unit or without having to carry a home vacuum cleaner out to an automobile.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the present invention.

FIG. 4 is an enlarged detail of a remote vacuum port of the present invention.

DESCRIPTION OF THE PREFERRED EMBODIMENT

Figure 1:
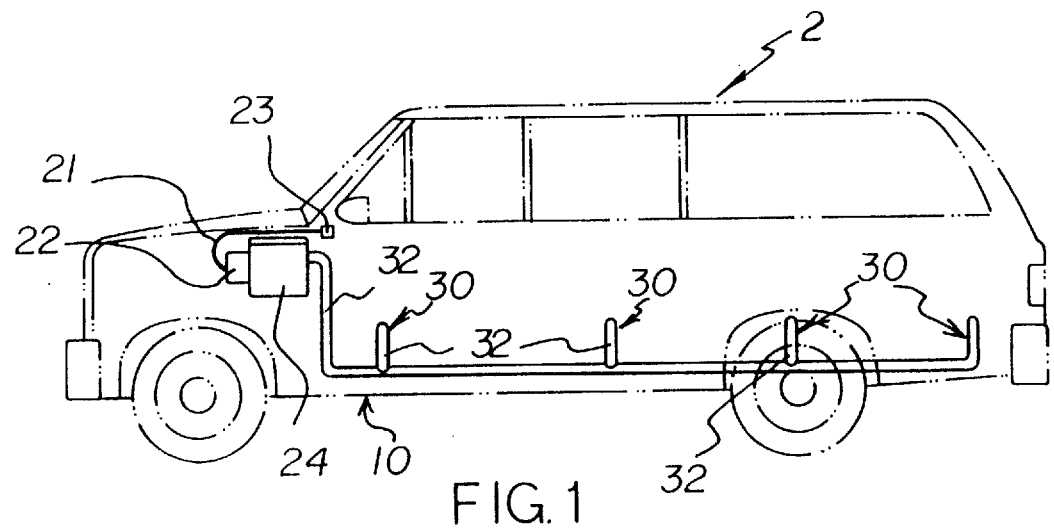
FIG. 1 is a side view of a new Automobile Central Vacuum Cleaning System installed in an automobile according to the present invention.

With reference now to the drawings, and in particular to FIGS. 1 through 6 thereof, a new Automobile Central Vacuum Cleaning System embodying the principles and concepts of the present invention and generally designated by the reference numeral 10 will be described.

Figure 2:
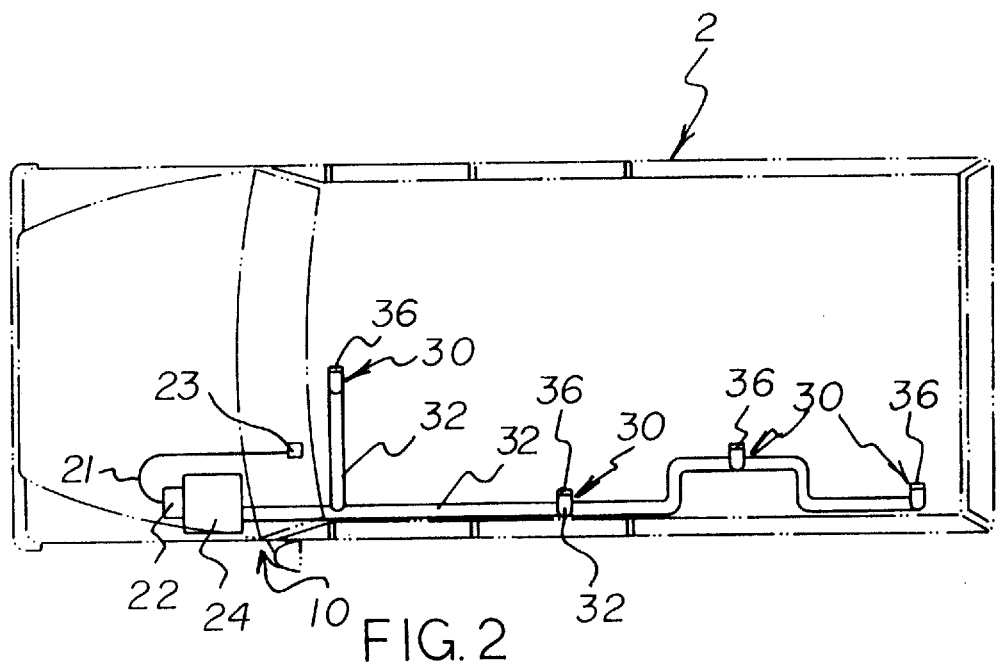
FIG. 2 is a top view thereof.

More specifically, it will be noted that the Automobile Central Vacuum Cleaning System 10 comprises a vacuum generating unit 20, a remote vacuum port 30, and a vacuum cleaner hose 40. As best illustrated in FIGS. 1 through 3, a remote vacuum line 32 is located within the panels of an automobile 2 and provides connection between a vacuum intake port 26 of the vacuum generating unit 20 and a vacuum hose attachment end 34 of the remote vacuum port 30. The remote vacuum port 30 is located strategically and conveniently within the passenger compartment of the automobile 2. A vacuum port attachment end 44 of the vacuum cleaner hose 40 is attached to the vacuum hose attachment end 34 of the remote vacuum port 30. The vacuum generating unit 20 includes a vacuum motor 22 and a debris collection unit 24. A vacuum power supply 21 provides power to the vacuum motor 22. Power may be generated by the battery or engine of the automobile 2. Power to the vacuum generating unit 20 may be controlled by a remote power switch 23 which is installed in a convenient location such as a dash board, a control or instrumentation panel, or console of the automobile 2.

Figure 5:
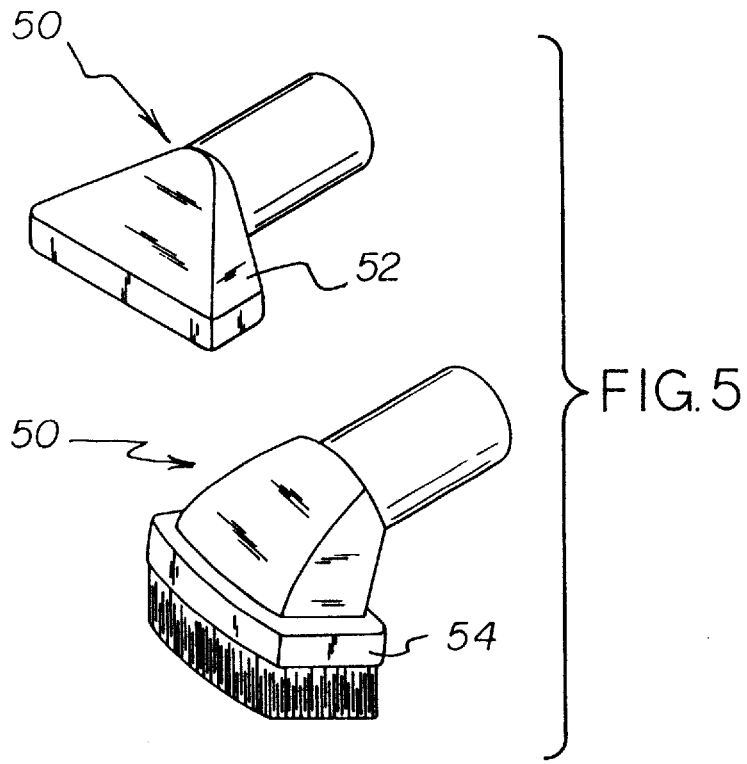
FIG. 5 shows examples of vacuum cleaner hose attachment tools for use with the present invention.

As illustrated in FIG. 3, the vacuum cleaner hose 40 comprises a flexible vacuum hose 42 with a vacuum port attachment end 44 and an attachment tool end 46. The flexible vacuum hose may be of the expandable and retractable type and may be stored under a front seat or in a rear compartment of the automobile 2. A vacuum cleaner hose attachment tool 50 may be attached to the attachment tool end 46 of the vacuum cleaner hose 40. Any old and well known attachment tools of those commonly used with vacuum cleaners may be used with the present invention. FIG. 5 depicts a rigid attachment tool 52 and a brush attachment tool 54.

As illustrated in FIG. 4, the vacuum hose attachment end 34 of the remote vacuum port 30 includes a vacuum port anti-clogging screen 33 to prevent the intake of large objects into the remote vacuum line 32 and a vacuum port sealing cover 36 to cover the vacuum hose attachment end 34 of the remote vacuum port 30 when not in use.

Figure 6:
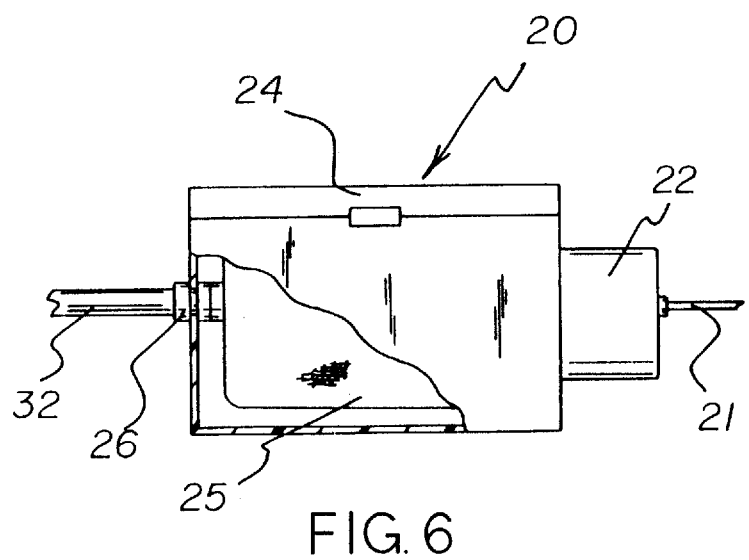
FIG. 6 is an enlarged detail of the vacuum generating unit of the present invention.

As illustrated in FIG. 6, the vacuum generating unit 20 includes a debris collection unit 24 which is located in a convenient place such that a debris receptacle 25 located within the debris collection unit 24 is readily accessible and may be emptied when necessary. A convenient location of the debris collection unit 24 is under the hood of the automobile 2.

In use, the vacuum port sealing cover 36 is removed from only one of the remote vacuum ports 30 at a time. The vacuum port attachment end 44 of the vacuum cleaner hose 40 is attached to the vacuum hose attachment end 34 of the remote vacuum port 30. A vacuum cleaner hose attachment tool 50 may be attached to the attachment tool end 46 of the flexible vacuum hose 42. The remote power switch 23 is engaged such that power is supplied to the vacuum motor 22. The vacuum cleaner hose 40 is used to remove debris from the floor, upholstery, and other areas. When finished, the remote power switch 23 is disengaged such that power is no longer supplied to the vacuum motor 22. The vacuum cleaner hose 40 is detached from the vacuum hose attachment end 34 of the remote vacuum port 30 and the vacuum port sealing cover 36 is replaced. If necessary, the same process is followed at another remote vacuum port 30. When finished vacuuming, the debris receptacle 25 is removed from the debris collection unit 24 and emptied. Once emptied, the debris receptacle 25 is replaced in the debris collection unit 24.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An Automobile Central Vacuum Cleaning System for use in an automobile, comprising:

a vacuum generating unit;

a remote vacuum port including a remote vacuum line and a vacuum hose attachment end, the remote vacuum line attached at one end to the vacuum generating unit and at another end to the vacuum hose attachment end, wherein the remote vacuum port is located within a passenger compartment of the automobile; and a vacuum cleaner hose removably attached to the vacuum hose attachment end of the remote vacuum port, wherein the remote vacuum port includes a vacuum port anti-clogging screen affixed within the vacuum hose attachment end of the remote vacuum line.

2. The Automobile Central Vacuum Cleaning System of claim 1, wherein the vacuum generating unit includes a vacuum motor and a remote power switch for controlling power to the vacuum motor.

3. The Automobile Central Vacuum Cleaning System of claim 2, wherein the remote power switch is located within the passenger compartment of the automobile.

4. The Automobile Central Vacuum Cleaning System of claim 1, wherein the vacuum generating unit includes a debris collection unit and a debris receptacle removably located within the debris collection unit.

5. The Automobile Central Vacuum Cleaning System of claim 4, wherein the debris collection unit is located under a hood of the automobile.

6. The Automobile Central Vacuum Cleaning System of claim 1, wherein the remote vacuum port includes a vacuum port sealing cover removably attached to the vacuum hose attachment end of the remote vacuum line.

7. The Automobile Central Vacuum Cleaning System of claim 1, wherein the vacuum cleaner hose further comprises a flexible vacuum hose having a vacuum port attachment end and an attachment tool end.

8. The Automobile Central Vacuum Cleaning System of claim 7, wherein the flexible vacuum hose is expandable and retractable.

9. The Automobile Central Vacuum Cleaning System of claim 7, wherein the vacuum cleaner hose includes a vacuum cleaner hose attachment tool removably attached to the attachment tool end of the flexible vacuum hose.

10. The Automobile Central Vacuum Cleaning System of claim 9, wherein the vacuum cleaner hose attachment tool is a rigid attachment tool.

11. The Automobile Central Vacuum Cleaning System of claim 9, wherein the vacuum cleaner hose attachment tool is a brush attachment tool.

* * * * *